United States Patent [19]

Richards et al.

[11] 4,002,850
[45] Jan. 11, 1977

[54] TRUNK ADAPTER

[75] Inventors: Glenn L. Richards, Caledonia; Uwe A. Pommerening, Webster, both of N.Y.

[73] Assignee: Stromberg-Carlson Corporation, Rochester, N.Y.

[22] Filed: Mar. 25, 1975

[21] Appl. No.: 561,871

[52] U.S. Cl. .......................................... 179/18 AH
[51] Int. Cl.² ...................................... H04Q 3/58
[58] Field of Search ................. 179/18 AD, 18 AH

[56] References Cited
UNITED STATES PATENTS 3,806,660   4/1974   Gueldenpfennig ............ 179/18 AH

*Primary Examiner*—William C. Cooper
*Attorney, Agent, or Firm*—Donald R. Antonelli; William F. Porter, Jr.

[57] ABSTRACT

A trunk adapter is associated with a common control private automatic branch exchange telephone system for interfacing the system with a central office. Four different types of adapters are associated with the system to effect a ring-down incoming, loop start outgoing trunk connection, a ground start type trunk connection, a two-way dial-to-dial trunk connection, and a two-way E and M signalling interface. To provide a buffer between the ring and tip circuits the adapters employ optical coupler circuits. The adapters are controlled by the common control on a time shared basis and operate independently of the state of the sleeve lead.

13 Claims, 11 Drawing Figures

TRUNK CIRCUIT 1 & 3

TRUNK CIRCUIT 2 & 4

TRUNK CIRCUIT 5

TRUNK CIRCUIT 6

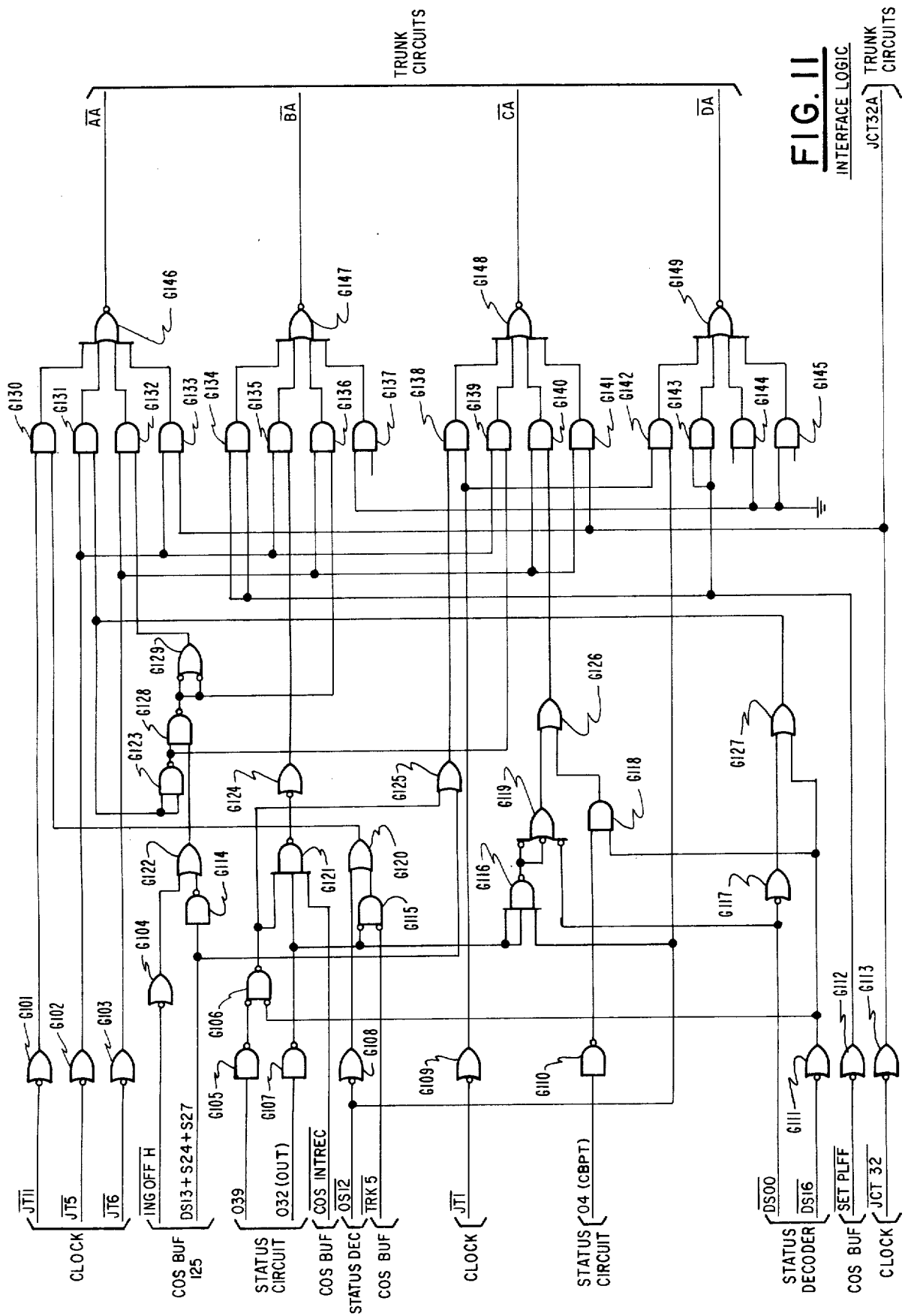

TRUNK ADAPTER

FIELD OF THE INVENTION

The present invention relates in general to telephone systems and, more particularly, to a trunk adapter for providing trunk interconnections between a common control private automatic branch exchange system (hereinafter termed PABX) and a central office.

BACKGROUND OF THE INVENTION

In conventional telephone systems of the common control type, for providing interconnections between the common control PABX and a central office, a large number of trunk circuits for the PABX are employed and the individual trunk circuit cards usually include both latching circuitry and all the control logic necessary for controlling the operation of the trunk. For controlling a trunk connection, the system monitors and operates on the sleeve lead and connections between a central office and the PABX are carried out on a per trunk basis.

In our co-pending application entitled "MATRIX-PBX" Ser. No. 431,928, filed Jan. 9,1974, and assigned to the assignee of the present application, now U.S. Pat. No. 3,943,297, there is disclosed a new and improved type of common control PABX, in which the switching matrix is completely independent of signalling between the line circuits and the common control with regard to line conditions and maintainence of the communication condition. Instead, the switching matrix is employed only for talking purposes and the common control is continuously associated with all circuits, so as to monitor the condition of each calling and called circuit. This operation is considerably different from conventional control functions provided in a common control PABX, wherein the common control is used to set up the call through the matrix and then drops out after the connection has been established. As a result, the trunk circuits for conventional systems are quite complex and, because the systems operate on a per trunk basis, a considerable number of trunk circuits are employed for the various types of system connection capabilities required.

BRIEF SUMMARY OF THE INVENTION

In accordance with the present invention, a trunk adapter is associated with a common control PABX system for providing trunk interconnection functions between the PABX system and an outside central office. Optical couplers are used for coupling signals from tip and ring circuits to solid state logic circuits. This provides relay-type isolation with high sensitivity, small size, low cost, and solid state reliability. In one of the trunk adapter types, the design creates a relatively sharp detection threshold to discriminate between high leakage idle conditions and the most adverse seizure condition. Since control of the system functions in the above referred to electronic MATRIX-PABX is carried out on a time shared basis by the common control, which remains associated with the various circuits of the system throughout the call, control operations for various trunk functions are performed by the common control on a time-shared basis and the logic circuitry of the trunk adapter is thereby significantly reduced.

Four different basic types of trunk adapters are employed. To the outside central office, each adapter appears as a conventional trunk circuit so that the common control PABX is compatible with the central office. In its association with the various components of the common control system, however, each individual trunk adapter is controlled on a time shared basis in accordance with logic functions carried out by the common control. Interface steering circuitry is coupled between the common control circuits and the adapter proper for supplying selective steering signals to a trunk multiplexing integrated circuit chip contained in the adapter. Within this chip are latches which control relays in the adapter and a multiplexer for sequencing supervision information onto a bus going to the common control. The adapter has tip and ring ports for the outside central office and for associated junctor circuitry. Each adapter also has a standard counter to provide a controllable duty cycle adjustment to the outpulsing wave form to compensate for fixed distortion produced within the PABX system.

A detailed explanation of the components included within and the operation of the trunk adapter of the present invention will be set forth below in connection with the attached drawings as well as reference to our above-referred to copending application.

BRIEF DESCRIPTION OF THE DRAWINGS

FIG. 11 is a logic diagram of interface steering circuitry coupled between the common control and trunk adapter in accordance with the present invention.

DETAILED DESCRIPTION OF THE INVENTION

Figure 1:
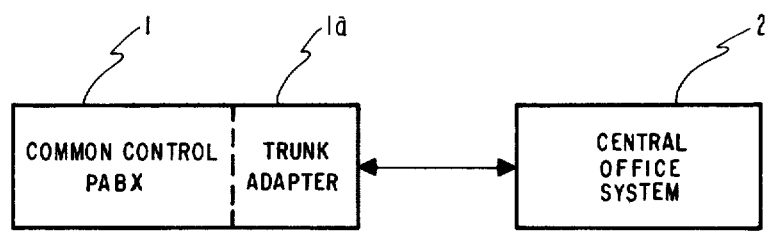
FIG. 1 is a simplified block diagram of the connection of a common control PABX to a central office system.

FIG. 1 schematically shows, in block diagram form, the incorporation of a trunk adapter 1a interfacing a common control PABX 1, particularly of the MATRIX-PBX type described in our above referred to copending application, with a central office system 2. As was explained briefly above, in conventional trunk coupling arrangements, monitor and control operations are carried out by way of the sleeve lead and each trunk contains all the necessary operation control logic.

In the above referred to MATRIX-PBX system, the various system circuits are continuously monitored and controlled on a time-shared basis by the common control, which is associated with trunk circuitry throughout a call. This is unlike conventional common control systems where the common control drops out after setting up the call and then control functions are carried out completely by the individual trunk circuits. The central office system 2, of course, does not know what type of trunk arrangement is connected with it, but presumes that it will be compatible. Since the common control PABX 1 operates on a time shared basis with continuous monitoring by the common control circuits, the trunk adapter 1a is employed to take advantage of the operation of the common control and yet still provide appropriate trunk connections between the PABX 1 and the central office 2. In essence, the trunk adapter 1a is an interface between the PABX system 1 and the central office 2, and adapts itself to whatever trunk function is normally available to the respective systems, so as to effectively carry out the required trunk functions and yet is considerably less complex that conventional trunk circuits.

Figure 2:
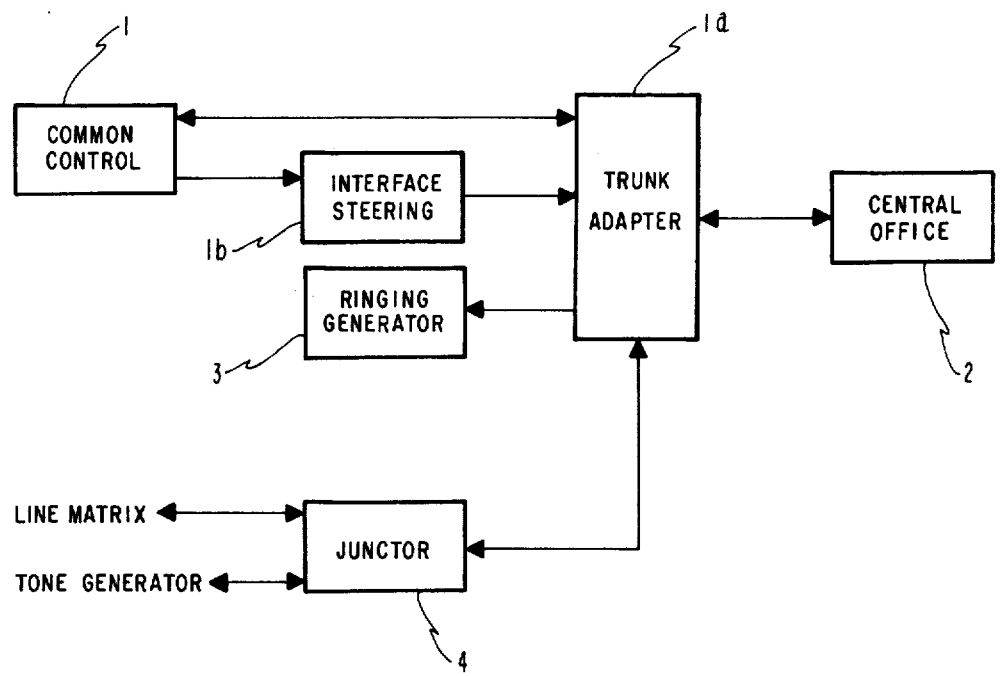
FIG. 2 is a block diagram illustrating the coupling of the trunk adapter of the invention.

The trunk adapter 1a receives control signals from and supplies operation result signals to common control circuits 1 of the PABX, as shown in FIG. 2. Interface steering circuits 1b, shown in detail in FIG. 11 and described below, receive various timing and status signals from the common control 1 and present these signals in appropriate time shared multiplex format to the trunk adapter. The trunk adapter is coupled to central office 2 through tip and ring connections for battery-ground, loop recognition signalling. The adapter 1a is also coupled to junctor circuitry 4 in the PABX and supplies ringing control signals to the PABX ringing generator 3.

The connection between the trunk adapter 1a and a traffic sensor (see FIG. 10) in the ringing generator 3 serves to signal the common control that an incoming trunk call is being presented. When the system is totally idle, a reset condition is applied. In addition, when power is removed from the logic circuits, the system is totally idle. When the traffic sensor detects traffic, it causes power to be applied to the logic circuitry and removes the reset condition from the system.

Figure 3:
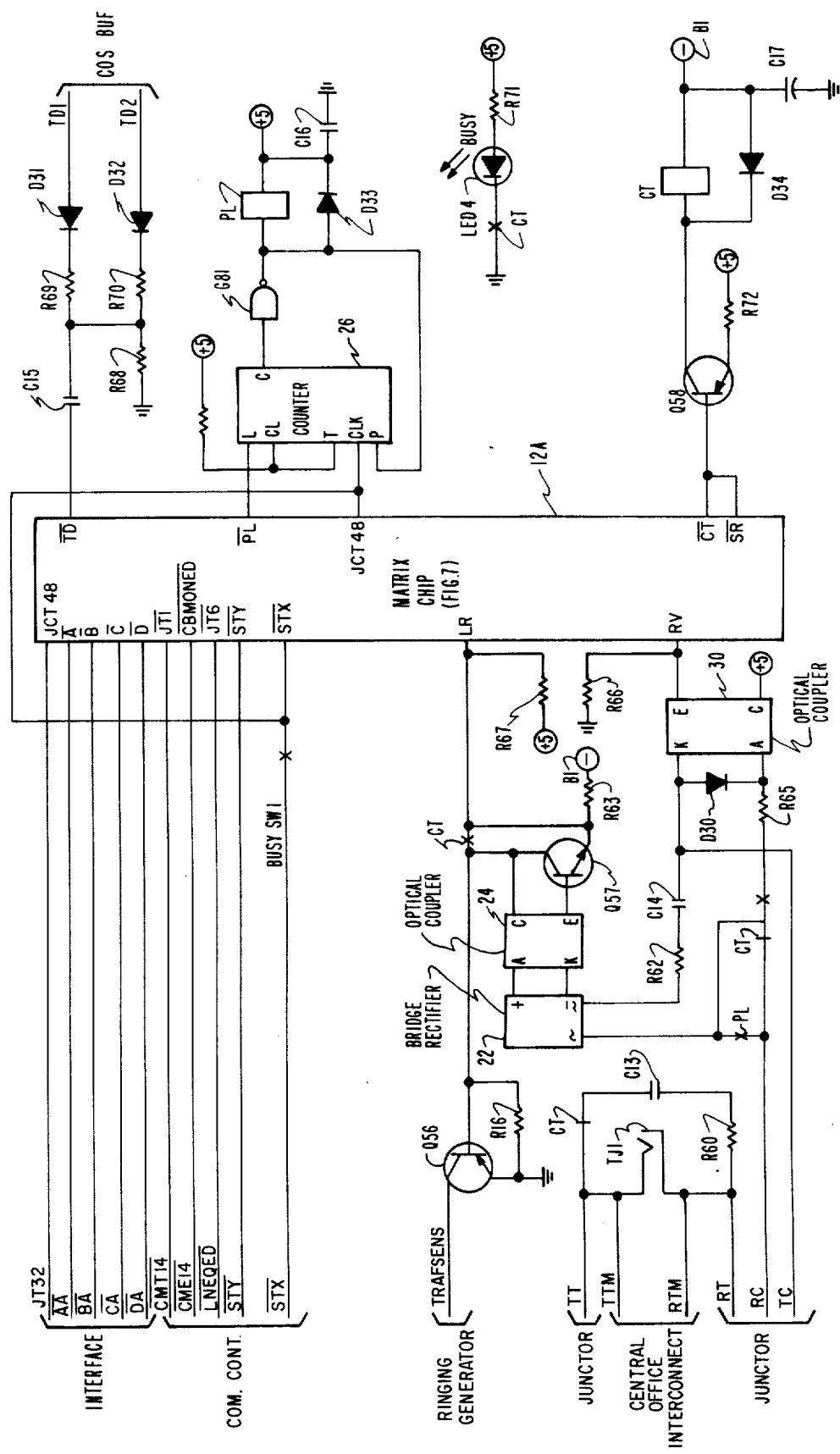
FIGS. 3–6 are schematic illustrations of various trunk adapter circuits which may be employed in accordance with the present invention.
Figure 4:
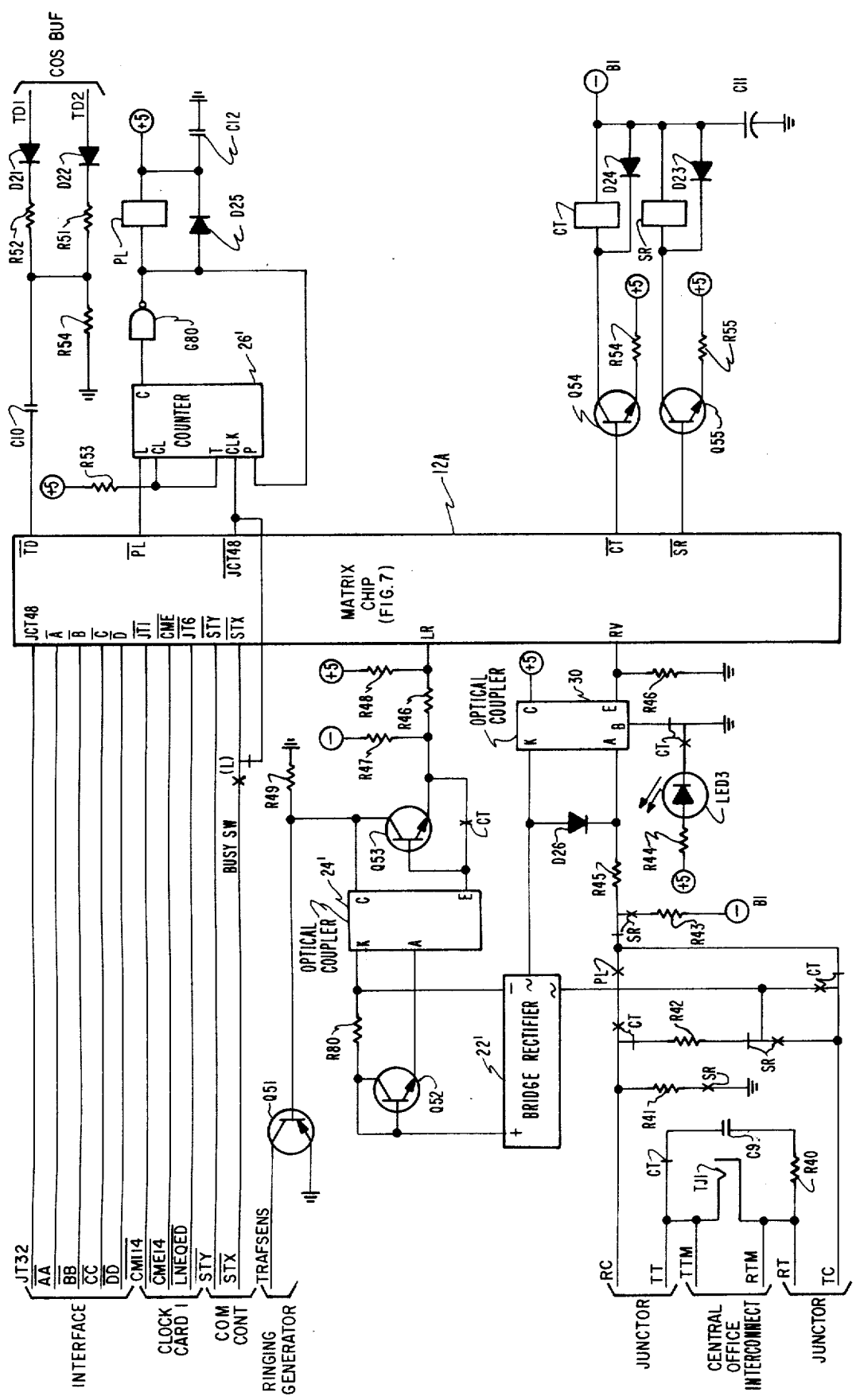
Figure 5:
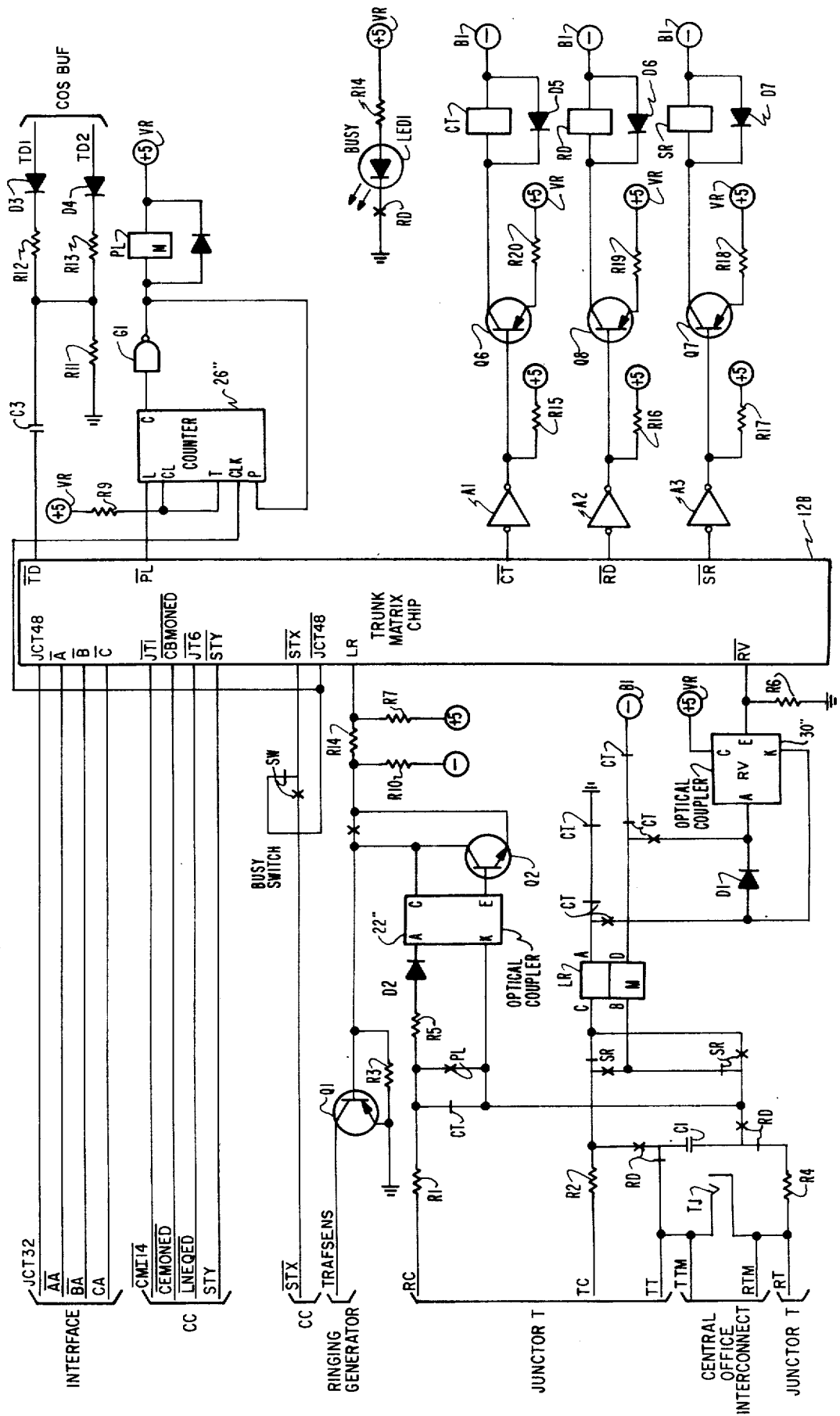
Figure 6:
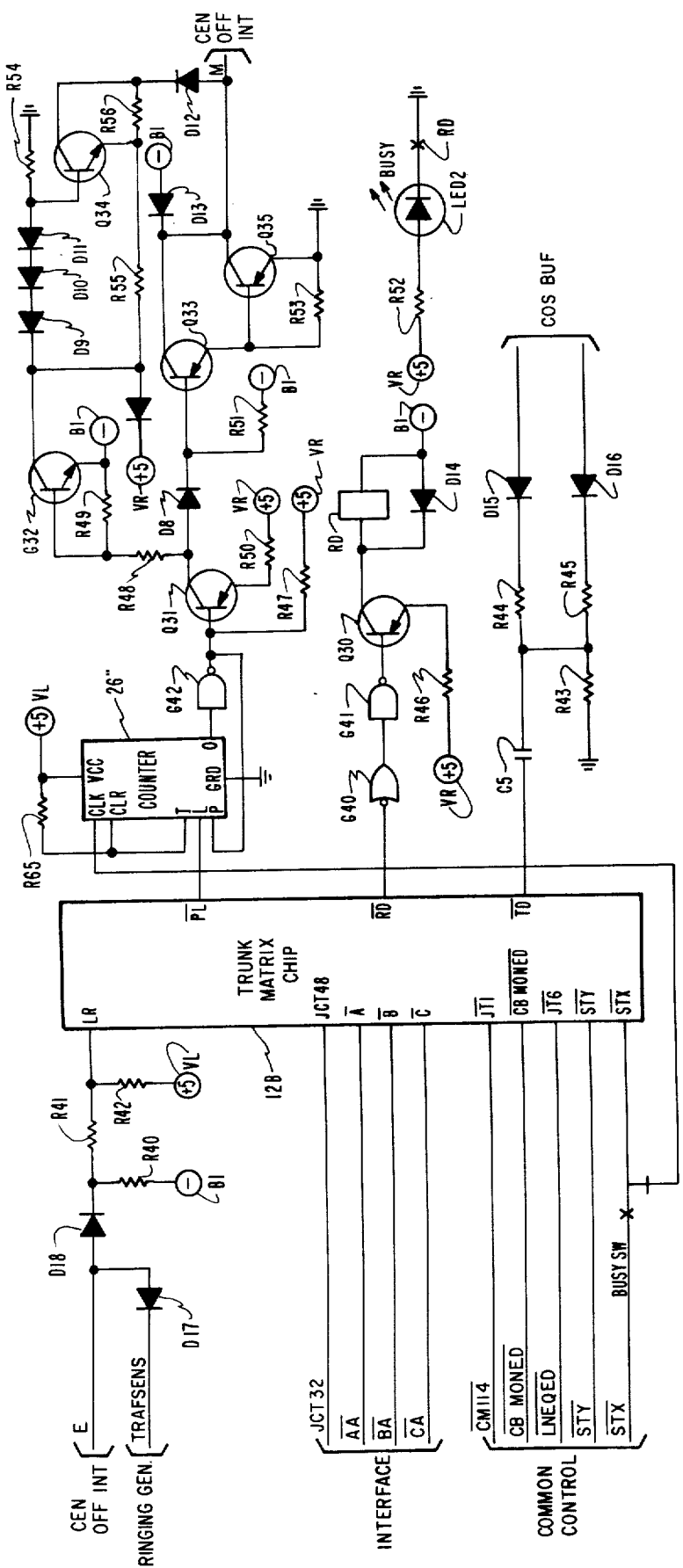
Figure 6:
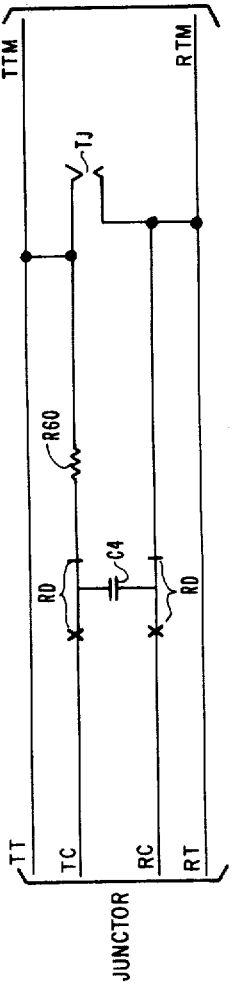

In accordance with the present invention, four different types of trunk adapters are available for implementing various trunk functions required for effecting the appropriate interconnections between the common control PABX 1 and the central office 2. A first type, designated trunk adapter type 1,3, shown in FIG. 3, provides loop start outgoing and ring down incoming operation. A second type, designated trunk adapter type 2,4, shown in FIG. 4, provides ground start operation. A third type, designated trunk adapter type 5, shown in FIG. 5, provides two way dial-to-dial operation and can be used as an incoming trunk only with either loop pulsing or battery ground pulsing. The fourth type, designated trunk adapter type 6, shown in FIG. 6, provides a two-way E and M signalling interface. All trunk types are interchangeable and each trunk adapter circuit card normally serves four trunks of a given type. The circuitry and operation of each type of adapter will be described below with reference to FIG. 3–6 respectively.

Adapter — 1 (Trunk type 1,3)

The trunk type 1,3 adapter, shown in FIG. 3, functions as a ring-down incoming group/loop start outgoing type trunk, which means that it is seized inwardly and released by application of 20 Hz ringing and is seized outwardly by placing a low resistance between tip and ring. Control leads JT32, $\overline{AA}$, $\overline{BA}$, $\overline{CA}$ and $\overline{DA}$ from the interface circuitry are supplied to demultiplexer matrix chip 12A (shown in FIG. 7) for controlling the latch circuits of the demultiplexer, the latch circuits controlling the operation of pulsing relay PL and the CT relay. Input lines $\overline{CMT\ 14}$, $\overline{CME14}$, LNEQED, STY and STX couple control signals from the common control to the demultiplexer chip 12A. Ring and tip leads $\overline{RT}$, $\overline{TT}$, $\overline{RC}$, $\overline{TC}$ and RTM, TTM connect the adapter to a junctor (shown in FIG. 9) and the outside interconnect circuitry to the central office. Capacitor C13 and resistor R60 connected in series across the junctor ring and tip leads RT and TT for providing idle line termination. Line TRAFSENS supplies a traffic detection signal to the traffic sensor (shown in FIG. 10). Output lines TD1 and TD2 are connected to common control for updating the common control of the progress of the operation of the adapter. In the above referred to MATRIX-PBX telephone system, leads TD1 and TD2 are selectively strapped to appropriate inputs of the class of service buffer 125. For a more lucid understanding of the adapter shown in FIG. 3, description of the remaining components will be accompanied by a description of their function and operation.

A bridge rectifer 22, which operates on a capacitor coupled AC input, is normally connected across ring and tip leads RC and TC in the trunk idle condition, relay CT not having been energized. In the normal or idle condition of the trunk, in addition to seeing the high impedance placed across the ring and tip lines by resistor R60 and capacitor C13, leads RT and TT are connected to leads RTM and TTM, respectively, which come from the central office. Leads RT and TT themselves are connected through the retard coil of the junctor transformer TR1, shown in FIG. 9, to leads RC and TC and back to the trunk adapter circuit. ON inward seizure from the central office, a 20 Hz ringing voltage from the junctor is coupled to the AC inputs of the bridge rectifier 22 and is converted to a pulsing DC voltage which is coupled to the A, K inputs of optical coupler 24. Each of the optical couplers 24 and 30 is made up of a light emitting diode having its anode and cathode connected across input terminals A and K, while a detection transistor is connected across output terminals C and E and operates as a high impedance current sensor. The output of the optical coupler 24 is amplified via emitter follower transistor Q57 which supplies an input logic signal at input LR of matrix chip 12A. The 20Hz ringing voltage produces a modulating waveform which the system filters out by way of a timer filter which is described in our copending application filed, Mar. 5, 1975 entitled "Timer Associated With CB Relay" and assigned to the assignee of the present application, to present a continuous indication to the trunk circuit and maintain the trunk seized with the CT relay operated. Simultaneously, the forward bias of emitter follower transistor Q57 causes transistor Q56 to turn-on, which supplies a signal on traffic sensor line TRAFSENS to the ringing generator (FIG. 10) to advise the system of the existence of an inward seizure to result in a turn on of logic power.

The logic level applied to input LR of matrix chip 12A is multiplexed to output TD and sent to the common control circuits. When the called station answers, at the appropriate time slot, in accordance with system timing, the details of which are described in detail in our above-referred to copending application Serial No. 431,928, the common control supplies input signals to line $\overline{C}$ via the interface steering circuitry, $\overline{CME}$ and $\overline{STX}$ or $\overline{STY}$, which supply steering signals to select the first adapter on the trunk adapter card, to switch the latch flip-flop CTFF including gates G76 and G78, in chip 12A, to thereby provide an output on lead CT and energize relay CT by way of transistor Q58. When the CT relay is energized, light emitting diode LED 4 is energized, to provide a busy lamp indication that the trunk is now occupied.

Upon energization of the CT relay, the normally-closed contacts of relay CT open and the normally open contacts of relay CT close. This action removes the resistor-capacitor idle line termination from the ring-tip leads RT and TT to the junctor, places a low impedance path across the ring and tip leads RTM and TTM going to the central office and also by-passes the bridge rectifier 22. As a result of the low impedance placed across the tip and ring leads TTM and RTM, the central office is advised that it should cease ringing the line. The closure of the normally open contacts of the CT relay bypasses transistor Q57 and, through resistor R 64 to the LR input of matrix chip 12A, provides a continuous input thereto. As a consequence, the central office cannot release this type of trunk, a release being effected only by a local party. The ring and tip leads RC and TC from the junctor are now connected to a reverse battery sensing circuit including a second optical coupler 30. The inclusion or exclusion of the reverse battery sensing circuit determines whether the trunk adapter circuit is type 1 or type 3. A strapping connection between the TC lead and the A input terminal of coupler 30 effectively removes the reverse-battery sensing from the adapter to define a type-1 adapter. Without such strapping, as shown in FIG. 3, the adapter is defined as a type 3 adapter. A reverse battery condition from the central office may be presented for the purpose of toll restriction or answer supervision. The reverse battery sensing circuit will sense DC current in one direction and by-pass it in another. Reverse battery is defined as battery potential on the tip circuit and ground potential on the ring circuit. Upon sensing a reverse battery condition, optical coupler 30 supplies an input to matrix chip 12A on terminal Rv. As it did with the signal input at LR, the matrix chip 12A multiplexes its RV input for application on output line $\overline{TD}$ for transmission to the class of service buffer of the common control. The common control supplies control steering signals through the interface circuitry, the outputs of which ($\overline{AA}$, $\overline{BA}$, $\overline{CA}$, $\overline{DA}$) are clocked into the matrix chip 12 by the signals $\overline{STX}$ and $\overline{STY}$, to control the CT and PL relays. The signals STX and STY serve to select the logic for one of the four trunks serviced by the matrix chip 12A. The signals $\overline{CME}$, $\overline{JT1}$ and $\overline{JT6}$ (shown in FIG. 7) steer the $\overline{A}$, $\overline{B}$, $\overline{C}$ and $\overline{D}$ data signals to the appropriate flip-flop inputs.

The PL relay reflects, through the trunk loop, the on-hook, off-hook condition of the calling line on an outward call, or indicates to the central office a response to an inward seizure by presenting an off-hook condition upon inward seizure. When the matrix chip 12A supplies an output over line PL, a 4 bit binary divided counter 26 is driven. This counter introduces a prescribed distortion into the waveform which compensates for distortion previously imparted to it in other circuits, so that the counter 26 is, in effect, a pulse distortion compensator. Logically, counter 26 does not effect the output which is coupled through inverting gate G81 to control the PL relay. The contacts of relay PL open and close the loop for an outward call.

When the $\overline{PL}$ output of matrix chip 12A goes to ground, the activating input for the PL relay is released indicating an on-hook condition or an open loop condition toward the central office. A high level on the $\overline{PL}$ output activates the PL relay and thereby produces a low impedance between the tip and ring leads to the central office for an outgoing seizure, as both the CT and PL relays will be operated.

For coupling the $\overline{TD}$ outputs from a plurality of trunk adapters together, to be supplied to the COS buffer, isolation and level shifting circuitry including capacitor C15, resistors R68–R70 and diodes D31 and D32 is employed. Resistor R65 may or may not be included in the reverse battery sensor depending upon whether or not there is sufficient resistance in the loop to the central office, in order to limit the amount of current flowing through the optical coupler 30.

MATRIX CHIP 12A

Figure 7:
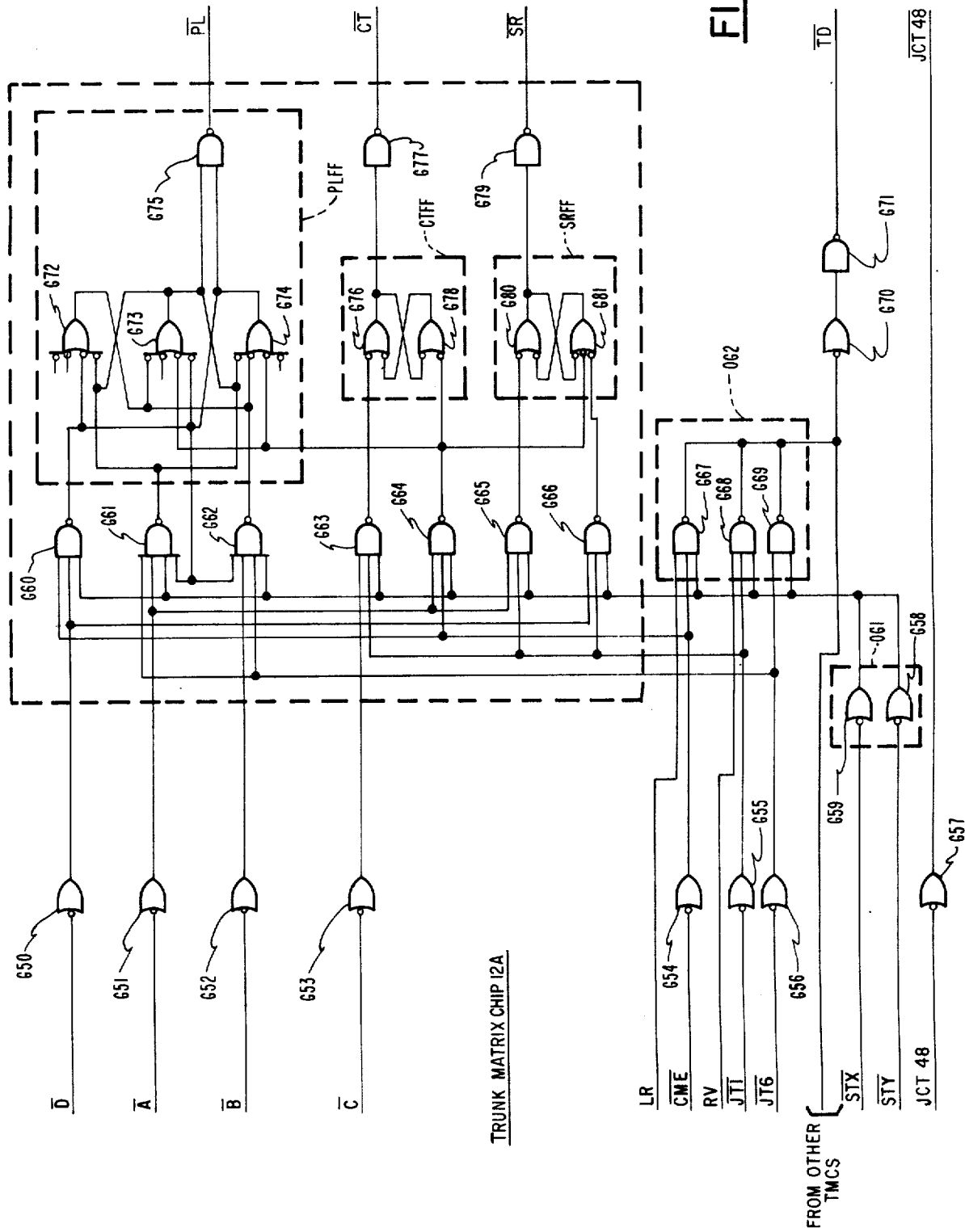
FIGS. 7 and 8 are logic circuit diagrams of the trunk matrix chip circuits contained in the trunk adapter circuits of FIGS. 3 and 4 and FIGS. 5 and 6, respectively.

The details of the matrix chip 12A are shown in FIG. 7. Input buffer gates G50-G57 reduce the loading on the driving sources from the interface circuitry and the common control to a one unit load. Inputs $\overline{A}$, $\overline{B}$, $\overline{C}$ and $\overline{D}$ from the interface circuitry provide control signals for the latching flip-flops PLFF, CTFF and SRFF. The other inputs CME, JT1, JT6, JCT48 are appropriate clock inputs from the common control circuits which steer the incoming information to the various latching circuits. OR gate circuit OG1 made up of gates G58 and G59 receives steering signals $\overline{STX}$ and $\overline{STY}$ which identify which particular trunk adapter circuit is to be accessed and enable demultiplexing gates G60–G66 for a particular trunk.

Latching flip-flop PLFF controls the PL relay; it is a tri-state latch having three stable states, one of which represents a lock-up condition controlled from the $\overline{D}$ input, the other two stages representing the reflection of the calling line supervision off-hook or on-hook and allow the PL relay to be set, operated and released on outward dialing.

Latching flip-flop CTFF reflects the required control for the CT relay, as does the SR flip-flop SRFF for the SR relay. The SR relay, while not used in the 1 and 3 type adapter, is employed in other adapters, and will be discussed subsequently. Gates G70–G71 effectively "OR" together the demultiplexing and latching circuitry for the other trunk circuits. While each trunk adapter card contains four complete circuits (there are four chip circuits for each clip 12A), only a single such logic circuit shown in FIG. 7, for purposes of explanatory simplicity. Gates G67–G69 multiplex the LR and RV inputs plus a continuous mark, which becomes a class of service mark through gates G70—G71 to the $\overline{TD}$ output line.

It should be noted that when the trunk junctor is in status zero (DSOO=1), data is fed to the flip-flops in the matrix chip 12A to force all of the flip-flops to the reset condition as is done when the busy switch is thrown to "Busy" (as described hereinafter).

Adapter-2(Trunk Type 2,4)

The trunk type 2,4 adapter, shown in FIG. 4, functions as a ground start type trunk, which means that for an outward seizure, ground is placed in the ring circuit, which is sensed by the central office. The central office, in turn, provides ground to the normally open-circuit tip. When this happens, the adapter recognizes that the tip has been grounded by the central office and transfers the termination at the PBX end from a ground condition to a loop condition as a low resistance between tip and ring. This allows loop pulsing to be presented as addressing data.

Like the type 1,3 trunk adapter circuit shown in FIG. 3, and described previously, this adapter circuit contains a bridge rectifier 22; and optical couplers 24' and 30'. Whether or not reverse battery sensing is included determines the type 2 or type 4 circuit as was the case with the type 1 or 3 circuit. The input and output connections are substantially the same as for trunk type 1,3 except that for type 2,4 the SR output of the matrix chip 12A is connected through transistor Q55 to the SR relay, rather than being tied to the CT output. For a better understanding of the interconnections involved, the description of this type of trunk adapter will proceed with a description of the operations effected in the circuit.

An inward seizure from the central office corresponds to ground being applied to the tip lead TTM. The tip lead TTM is connected to the junctor lead TT, which conducts ground through the retard coil of the transformer TR1 in the junctor, shown in FIG. 9, and returns ground over tip lead TC. At the same time, battery is applied from the central office over ring lead RTM. The ring lead RTM is connected to junctor lead RT which conducts battery potential through the retard coil of transformer TR1 in the junctor and returns battery potential over ring lead RC. Thus, upon an inward seizure, the battery from the central office supplies power from the sensor formed by bridge rectifier 22' and optical coupler 24'. Current to one of the AC inputs of rectifier 22' is limited by resistor R42. When ground is supplied from the central office on the tip, current will be low and the necessary high gain is provided by transistor Q53 in conjunction with optical coupler 24'. Transistor Q52 is an emitter follower connecting the DC output of the bridge rectifier 22' across the light emitting diode of the optical coupler 24'. Resistor R80 provides a current threshold function to the circuit so that it will reject D. C. currents below a prescribed level and current levels above this level will result in a proper sensing operation. This enables the circuit to ignore line leakage and yet detect a valid seizure. Upon a valid inward seizure, emitter follower transistor Q53 will supply a signal to the LR input of the matrix chip 12A and thereby cause the energization of the CT relay through transistor Q54 in the same manner as discussed above in connection with the operation of the type 1,3 trunk adapter, the common control responding to the TD output to supply the appropriate steering and control signals to the chip.

With the CT relay being energized, the idle line termination provided by C9 and R40 is removed by the opening of the normally closed contacts of the CT relay in series with the resistor-capacitor network across leads RT-TT, to convert the loop condition presented between TC and RC to a low impedance. This also by passes transistor Q53 to lower the sensitivity of the sensor to a level appropriate for the high loop current which will flow for this low impedance condition. The loop current flows through bridge rectifier 22' optical coupler 30' or through diode D26 which by passes optical coupler 30'. When the current direction is for normal conditions, i.e. ground potential on the tip lead and battery potential on the ring lead, current will flow through diode D26. The reverse battery sensor including diode D26 and optical coupler 30' is blocked by CT relay contact when the CT relay is not operated to avoid false indications at a time when no data is present. The PL relay is operated in the same manner as discussed above in connection with the operation of the type 1,3 trunk adapter.

For an outward call, reverse battery will be presented on tip and ring, as a result of answer supervision. Current will flow from ground or ring to battery on the tip, and then through the optical coupler 30' and present a mark on the RV input of the matrix chip 12A. This is multiplexed to the TD1 and TD2 output through the isolation-level shift network made up of capacitor C10, resistors R50–R52 and diodes D21 and D22 from the TD output of the matrix chip 12A, thereby informing the common control that reverse battery has been received.

The SR latching flip-flop SRFF to the matrix chip 12A provides an output over line SR to enable the SR relay through transistor Q55. Ground potential is now supplied through a 380 Ω resistor 1241 to the ring lead RC. At the same time, battery potential is supplied from battery B1 through resistors R43 and R45 to reverse battery sensing diode D26 through the bridge rectifier 22', the closed contacts of relay SR and back to the tip lead TC. Diode bridge 22' provides an output to the optical coupler 24', so that upon ground being applied to the tip lead when the central office responds to the ground on the ring lead RTM by placing ground on the tip lead TTM which is coupled to the tip lead TC through the junctor, a current path will be activated and the optical coupler 24' will drive the LR input of the matrix chip through emitter follower transistor Q53. When the signal at the LR input of the matrix chip 12A is multiplexed over output lines TD1, TD2 to the class of service buffer, the common control, through the interfacing circuitry, causes the SR flip-flop SRFF to be reset and thereby deactivate the SR relay. The CT flip-flop CTFF in the matrix chip 12A is set, to enable the CT relay. Activation of the CT relay places a low impedance loop across the ring and tip leads from the central office, including the bridge rectifier 22' and the optical coupler 24'

When the central office disconnects by opening the tip lead, the bridge rectifier-optical coupler sensor will recognize the reduced current flow and couple this information to the LR input of matrix 12A. When the local party releases the trunk, the CT relay will be released and change the loop condition to high impedance and restore high sensitivity to the sensor. The loop current to the central office will be reduced, thereby informing the central office that the trunk is releasing. The central office responds by opening the tip lead TTM circuit, reducing the current flow through the sensor by way of the LR input to the chip 12A to inform the common control that the central office connection has been terminated. With the central office released, the trunk adapter is now in the idle condition and the trunk is made available to new traffic. As was the case with the trunk type 1,3 adapter, a busy lamp LED 3 is energized upon activation of the CT relay. Also, pulse distortion counter 26' operates in the same manner as counter 26.

Adapter -3 (Trunk Type 5)

Figure 8:
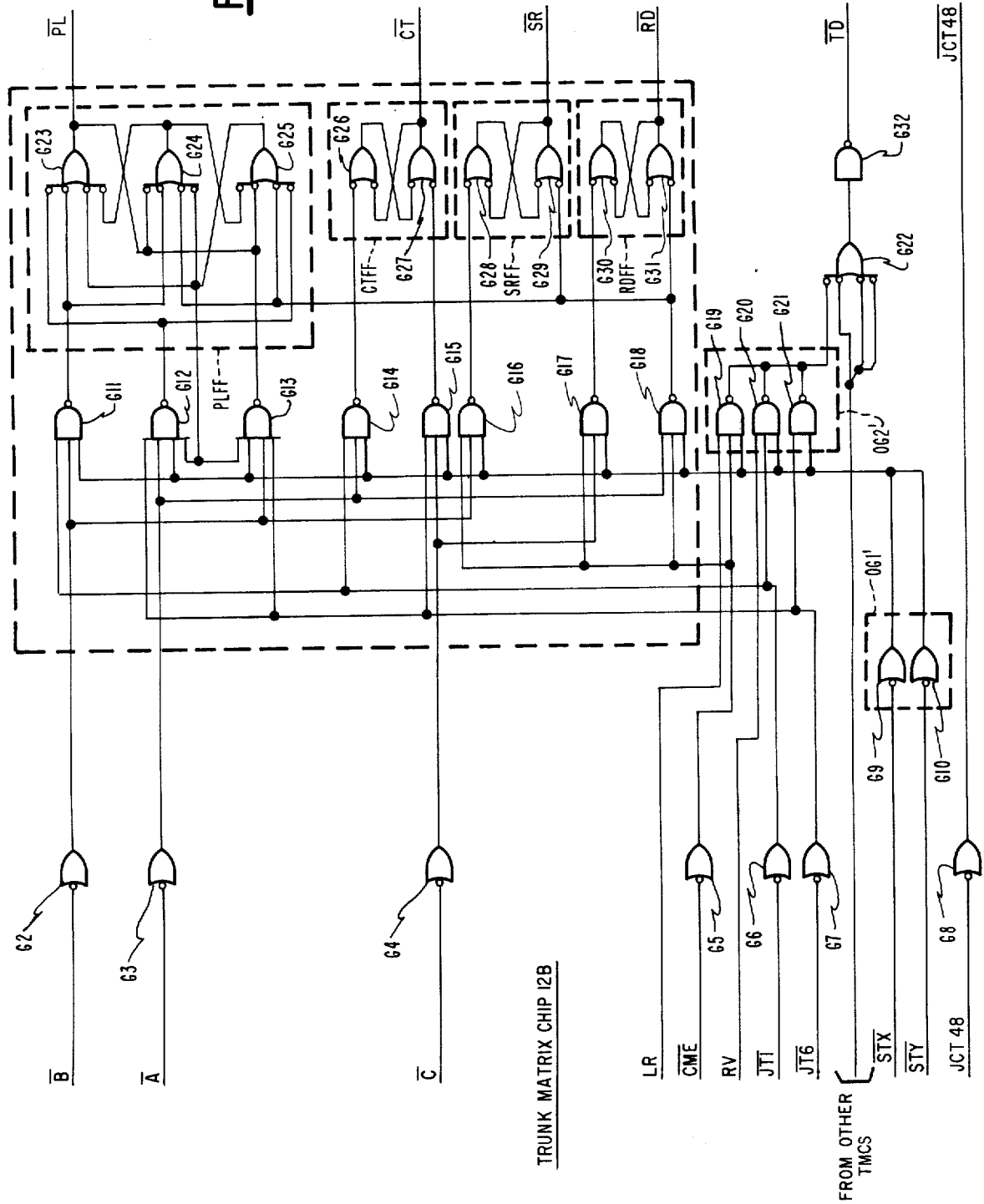

The trunk type 5 adapter, shown in FIG. 5, functions as a two-way dial-to-dial loop trunk circuit. The input and output lines included in trunk types 1–4 are also used in trunk type 5. In addition, the trunk matrix chip 12B, the details of which are illustrated in FIG. 8, which differs only slightly from trunk matrix chip 12A which is incorporated in trunk adapter types 1–4, described above, supplies an output $\overline{RD}$ which is coupled through a driver amplifier A2 and transistor Q8 to control the energization of the RD relay. The $\overline{CT}$ and $\overline{SR}$ outputs of matrix chip 12B are also coupled through respective amplifiers A1 and A3, to transistors Q6 and Q7, for energizing the CT and SR relays. The trunk type 5 adapter also incorporates a pulse distortion counter 26″, described previously, between its $\overline{PL}$ output and the inverter gate G1 for driving the PL relay. Similarly, output level shift isolation circuitry, made up of a capacitor C3, resistors R11–R13 and diodes D3 and D4, is used to permit the coupling of outputs from other type 5 adapters to the TD bus to the class-of-service buffer in the common control. The input control leads from the common control and interface circuitry are the same as those for trunk types 1–4 except that the $\overline{DA}$ output of the interface circuit is not used. The LR and $\overline{RV}$ inputs from the junctor and central office connection circuits are multiplexed in the matrix chip to be supplied over output TD in a manner similar to the operation of matrix chip 12B in trunk types 1–4, as will be explained hereinafter in connection with FIG. 8.

Now, considering the interconnections and operation of the circuit components of the type 5 trunk adapter, for an idle condition, as is the case with the type 1–4 trunk adapters, idle line termination is provided by a series RC circuit across tip and ring. Resistor R4 and capacitor C1 are connected in series with normally closed contacts of the RD relay and ring and tip leads RT and TT. When the trunk circuit is seized, the RD relay is energized and disconnects the RC circuit from the tip and ring leads and, in turn, connects capacitor C1 across the rest of the network to provide a filtering action.

Figure 9:
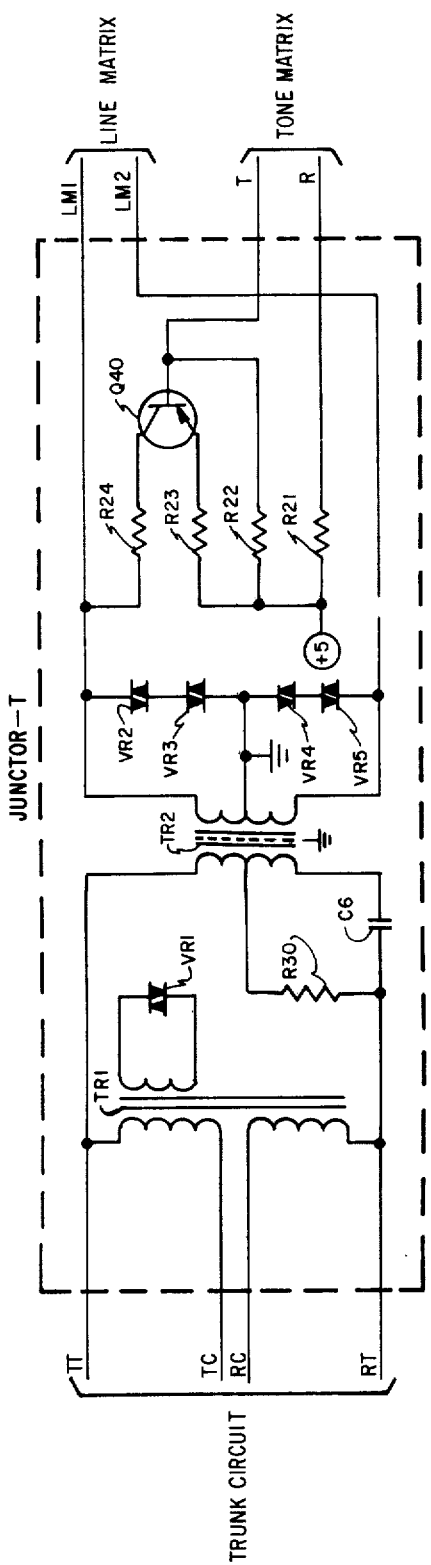
FIG. 9 is a schematic diagram of a junctor circuit to which the trunk adapter of the present invention is coupled.

Like the tip and ring connections for adapter types 1–4, the analog signals from the central office are supplied over ring and tip leads RTM and TTM, then out over leads RT and TT to the retard coil of the transformer TR1 of the junctor, as shown in FIG. 9, and back to the adapter over leads RC and TC. Resistors R1 and R2 are optional series resistances for reducing current flow through the path in the event the central office's line resistance is small. Optical couplers 22″ and 30″ are provided for supplying drive signals to the LR and $\overline{RV}$ inputs of the matrix chip, in a manner similar to the case for adapter types 1–4. However, no rectifier bridge is used, and an additional battery feed relay LR is inserted in the circuit.

The relay LR provides battery feed for normal operation, normal condition, i.e. for an idle condition, the CT relay being released, so that ground potential is supplied through the normally closed CT and SR contacts and the AC terminal of the relay LR to the tip TC lead, while battery potential is supplied through the normally closed CT and SR contacts, and the BD terminals of the relay LR to the ring RC lead. The typical condition at the other end, i.e. at the central office, is either the same — battery to ring and ground to tip, or it could be an open circuit. An inward seizure can be carried out simply by connecting the loop across the central office end.

Optical coupler 30″ is connected when the CT relay is operated and will sense reverse battery if it exists. Reverse battery causes ground potential to appear on the tip lead. The contacts of the SR relay allow battery to be reversed for an inward call once the call has proceeded to an answer condition. This provides reverse battery answer supervision back to the central office, so that the central office will recognize that existence of a connection. The output of the reverse battery sensor including diode D1 and optical coupler 30″ is coupled to the $\overline{RV}$ input of the matrix chip 12B to cause a logic signal to be multiplexed over the TD output to advise the common control that reverse battery has been sent to the central office.

The LR input of the matrix chip may be supplied over one of two paths. A first path is from the optical coupler 22″ through the emitter follower transistor $Q_2$ and then through resistor $R_8$. The other path is provided upon the activation of the LR relay through its closed contacts. This latter path is the normal path when the central office causes a loop current to flow in the circuit, the relay LR being activated to cause a logic high level to be supplied to the LR input of matrix chip 12B. The closure of the LR relay contacts also results in a connection between the base of transistor Q1 and the input network for the LR input of matrix chip 12B. This turns on transistor Q1, to provide a traffic condition signal in its collector over lead TRAFSENS, to the ringing circuit, as is the case for the previously described adapter types 1–4.

For an outgoing call, upon the CT relay being activated, the condition of the LR relay is switched over, removing the battery and ground connection and providing a loop condition with the A and D terminals of the LR relay being connected together through the closed CT contacts and the reverse battery sensing circuit. For an outward call, when the central office has responded, answer supervision is indicated through reverse battery-battery potential on tip and ground potential on ring. Now, the PABX party may attempt to release the trunk. If the trunk were to release and resume its idle condition, ground potential would be presented on tip and battery potential would be presented on ring, which results in a latch-up of the LR relay. The CT relay remains energized initially. As the local PABX party releases, the PL relay is released. This presents a high impedance circuit toward the central office which would normally release the LR relay. However, the optical coupler 22″ is placed across the open contacts of the CT relay and the PL relay, and is able to sense the central office presenting reverse battery. As long as this condition exists, optical coupler 22″ provides and output which supplies an off-hook or seized condition to the LR input of the trunk matrix chip 12B. As soon as the central office recognizes the existence of a high impedance on the loop, normal battery will be restored (i.e. battery on ring, ground on tip) and this will be detected by the optical coupler 22″ to remove the seized indication from its output and, consequently, the LR input of matrix chip 12B. Thus, a potential latch condition is obviated, to ensure a reliable operation for two-way dial-to-dial operation, which would normally be hazardous without such a guard detector.

The $\overline{SR}$ output of the matrix chip 12B activates the SR relay through amplifier A3 and transistor Q7 on an inward call, when the call has been terminated with an appropriate terminating party. The closure of the normally open SR contacts, upon activation of the SR relay, provides reverse battery through the LR relay to the TC and RC leads and back to the central office.

The $\overline{RD}$ output of the matrix chip 12B provides an output signal to energize the RD relay through amplifier A2 and transistor Q8 whenever the trunk has been seized for either an inward call or an outward call. As explained previously, activation of the RD relay removes the idle line termination RC circuit signals and other portions of the supervisory circuitry. Closure of the normally open RD relay contacts also results in the application of power to the LED 1 lamp for providing a busy indication.

Trunk Adapter 4 (Type 6)

The type 6 trunk adapter, shown in FIG. 6, provides a two-way E and M signalling interface. The E input lead is coupled through a diode-resistor matching network (D18, R40–R42) to the LR input of matrix chip 12B. The control inputs for chip 12B from the common control are, again, the same for the previously described trunk adapter type 5. The potential on the E lead goes low (ground potential) for an off-hook condition, and goes to either a low impedance negative potential or presents an open circuit for an idle on-hook condition. The E lead also supplies the traffic sensor control potential through diode D17 over line TRAFSENS to the ringing generator for the same purpose as described previously for the TRAFSENS line for the trunk types 1–5. Resistors R40–R41 provide a translation from 48 volts and ground type signalling to the appropriate logic levels required by the LR input of the matrix chip 12B. Again, the LR input is multiplexed through the chip 12B under control of the controls input from the interface circuitry and common control to be delivered to the $\overline{TD}$ output, for coupling to the class of service buffer in the common control. Similarly, the $\overline{PL}$ output is provided through the pulse distortion counter 26''' as is the case for the other types of adapters. In this adapter, however, in place of the PL relay winding and its associated contacts, the output pulsing lead is coupled through an interface transistor network, to selectively provide appropriate signal formatting, e.g. hard ground, hard battery, an open circuit, ground for an on-hook, ground for off-hook, etc. The network provides hard ground through transistor Q35 and hard battery through transistor Q34 and current limiting diode D12 to the M output lead back to the control office.

The $\overline{RD}$ output of matrix chip 12B activates the RD relay through gates G40 and G41 and transistor Q30 whenever the trunk adapter circuit is seized, for both incoming and outgoing calls. Again, activation of the RD relay removes the idle line RC termination network, here R60 and C4, and energizes the busy lamp LED 2. When the RC network is removed from the ring and tip leads RT and TT, the capacitor C4 is inserted across the junction transformer TR1, shown in FIG. 9, by way of tip and ring leads TC and RC.

MATRIX CHIP 12B

The above described trunk adapter types 5 and 6 incorporate a trunk matrix chip 12B, schematically shown in FIG. 8, in place of the chip 12A used in trunk adapter types 1–4. The configuration and operation of the logic network of the chip 12B is essentially the same as that of chip 12A. Latching flip-flops PLFF, CTFF, and SRFF provide the outputs PL, CT and SR for control of the $\overline{PL}$, $\overline{CT}$ and $\overline{SR}$ relays, respectively. The matrix chip 12B contains an additional latching flip-flop RDFF for actuating the seizure relay RD. Also, the $\overline{DA}$ input from the interface logic circuitry, shown in FIG. 11, is not employed. The plural inputs of gate G22 are respectively connected to the other corresponding gate circuits OG2' for the demultiplexing gates and latching flip-flop on the matrix chip card.

As is apparent from the schematic circuit diagram of FIGS. 5 and 6 for the trunk adapter types 5 and 6, respectively, all the latching flip-flop functions are employed in the type 5 trunk adapter while the CT and SR outputs remain unused in the type 6 adapter. The multiplexing gates C19–G21 of circuit OG2' combine the inputs from the LR and RV lines with a continuous mark for the trunk which becomes a class-of-service mark for the trunk and presents the date via gates G22–G32 to output line $\overline{TD}$.

In each of the above-described trunk adapter types 1–6, busy switch contacts are provided in the $\overline{STX}$ line, and the clock line from the pulse distortion counter. These busy switch contacts normally allow the trunk adapter circuit to be operated through the $\overline{AA}$, $\overline{BA}$, $\overline{CA}$ and $\overline{DA}$ inputs via the latching flip-flops connected thereto. With the busy switch operated (in the busy state), the inputs are inhibited and all the latching flip-flops PLFF, CTFF, RDFF, SRFF are reset by data in the appropriate $\overline{A}$ and $\overline{C}$ inputs and by a clock pulse provided on lead JCT 48, to the $\overline{STX}$ input. This reset operation ensures that the trunk adapter circuit is forced into an idle condition and all relays will be released irrespective of any noise which might accidentally set the latching flip-flops. Also the tip and ring lines at the inputs of each adapter are equipped with a trunk jack TJ for plugin access to the trunk circuit.

JUNCTOR CIRCUIT

A schematic circuit diagram of a junctor circuit to which the above-described adapters 1–6 are connected is shown in FIG. 9. The leads TT, TC, RT and RC connect the transformer TR1 to the trunk adapter. The varistors VR1 across the winding of the retard coil effectively reduce the inductance of the retard coil for high level signals presented by dialing, to prevent the inductance of the retard coil from distorting the waveform. The transformer TR1 retard coil presents a high AC impedance for normal voice signals. The signals are coupled through the A or B windings transformer TR2 which provides an optional match between 900Ω (A wiring) trunk circuits, or 6000 Ω (B wiring) trunk circuits. The secondary of TR2 is varistor clamped to prevent dial pulses or lightning surges from producing excessive voltage across the leads LM1 and LM2. These leads supply the idle signal to the line matrix. The bias driving leads T and R for transistor Q40 are coupled to the tone matrix.

TRAFFIC SENSOR

Figure 10:
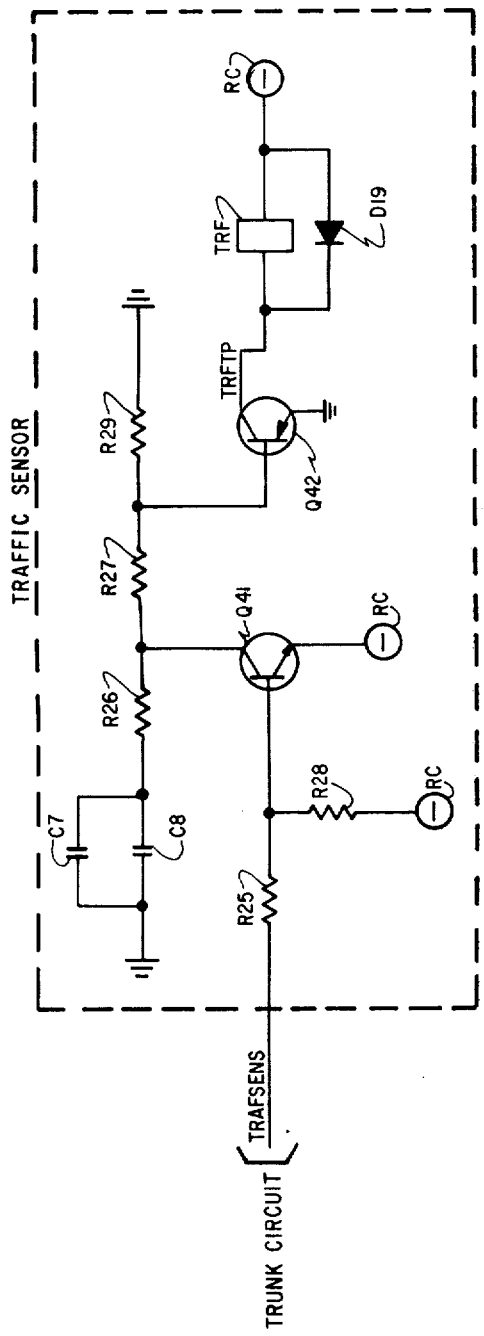
FIG. 10 is a schematic diagram of a traffic sensor which may be connected to the trunk adapter of the present invention.

The ringing generator, shown in FIG. 10, contains transistors Q41 and Q42 for supplying a traffic signal to the TRF relay. The input is connected to the trunk adapter over lead TRAFSENS through R25 to the base of Q41. The ringing generator provides an interface between the signal levels on the TRAFSENS level and what is required by the system. For example, during inward seizure for a loop start trunk type 1 and 3, ringing will be "ON" for 1 second and "OFF" for up to 7 seconds. Ground potential will be supplied over line TRFTP as Q42 is turned on immediately upon Q41 sensing ground potential on the TRAFSENS level, to operate the TRF relay. This causes a power-on clear function to initially reset all latch flip-flops in the matrix chips 12A and 12B. If the TRAFSENS lead should become an open circuit, the capacitor pair C7–C8 will maintain a sufficient voltage to Q42 to keep ground potential on its collector for a period of about 14 seconds. This is sufficient to bridge the pause between ring cycles or when seizures from a line circuit bridges the on-hook condition between dial impulses, to provide a continuous indication of the existence of a trunk traffic condition during these intervals. Once the traffic condition ceases or there is an open circuit exceeding a fourteen second interval, the system will be advised by way of release on the TRF relay. This usually involves removal of logic power (as distinguished from system power) to conserve energy.

INTERFACE LOGIC

In order to appropriately format control signals from the common control to supply signals $\overline{AA}$, $\overline{BA}$, $\overline{CA}$ and $\overline{DA}$ to the trunk matrix chips, interface logic circuitry, shown in FIG. 11, is provided. The interface circuitry receives the various input control signals from the common control circuits, including clock signals, signals from the status decoder, status circuit, and class-of-service buffer, described in detail in our above referred to copending application Ser. No. 431,928 entitled MATRIX-PBX, and reference may be directed thereto for a more specific explanation of the generation thereof, particularly with regard to the various junctor time slot signals.

For the first junctor time slot signal JT1 supplied through NOR gate G109 to AND gate G138, various trunk function signals from the status decoder circuitry, corresponding to a trunk call in progress (DS13), trunk consulation (S24) or sender outpulsing (S27) are delivered through OR gate G125 to the other input of AND gate G138 to provide an output on line $\overline{CA}$ to be delivered to the trunk adapter matrix chip. OR gate 125 also delivers an enabling input to AND gate G138 at this time for trunk release delay and the junctor memory PL bit signals coupled through gates G105 and G111 to gate G106, and then to gate G125. The junction time slot signal $\overline{JT1}$ and the interface output signal $\overline{CA}$ from gate C148 set the CT latching flip-flop CTFF through gate C63 in matrix chip 12A. For the same junctor time slot signal $\overline{JT1}$, a trunk junctor seizure signal $\overline{DS12}$ from the status decoder is coupled to gate G142 with the JT1 output of gate G109, to supply an output over the $\overline{DA}$ line from gate G149. This $\overline{DA}$ signal is coupled with the JT1 signal through gate G66 to reset the SR latch flip-flop SRFF in matrix chip 12A.

The next enabling junctor time signal $\overline{JT5}$ from the clock circuitry of the common control is coupled through gate 102 to the inputs of gates G131, G133, G135 and G139. A service request signal (S00), a trunk release delay signal (S16) and junctor time slot clock signal (JCT32) are respectively coupled through gates G117–G127, G117–G127–G123, gates G111–G106–G121–G124, and gate G113, so that respective $\overline{AA}$, $\overline{BA}$ and $\overline{CA}$ outputs are provided by gates G146, G147, and G148, respectively. These signals reset the SR and PL flip-flops in both matrix chips 12A and 12B, reset the CT flip-flop in matrix chip 12A and reset the RD flip-flop in matrix chip 12B. Also, during junctor slot JT5, the MPL input, for the junctor memory PL bit, the, 032 (out) lead for signalling a tie trunk connection, a trunk release delay signal S16 and an intercept recorder class-of-service indication $\overline{COSIN-TREC}$ from the COS Buffer are coupled through gates G105–G111–G106, G107,–G121–G124–G135 to provide an output a level $\overline{BA}$ from gate G147 to set the SR flip-flop in matrix chip 12B. Similarly, a $\overline{CA}$ output from gate G148 is provided from inputs $\overline{DS00}$ and $\overline{DS16}$ through gates G111, G127, G123 and G102–G139.

At junctor time slot JT6, the PL relay in each matrix chip 12A and 12B is reset by the $\overline{BA}$ signal from gate G147 in response to inputs over lines INGOFF H corresponding to the calling party going off-hook, the trunk signals DS13 + S24 +S27 from the status decoder and the S00 or S16 line signals. These are coupled through gates G104, G114–G122–G128–G136. Gate G136 also receives the JT6 signal from input $\overline{JT6}$ through inverting gate G103. Also, an output is provided from gate G146 for the same interface input signal to set the PL latch flip-flop.

For signals on the above referred to input lines $\overline{DS00}$, $\overline{DS16}$, $\overline{DS12}$, $\overline{OUT}$ and JCT32 together with a filtered trunk off-hook signal CBPT, gate G148 will provide an output over line $\overline{CA}$ to matrix chip 12B to reset the CT latch flip-flop CTFF.

At junctor slot JT11, the $\overline{DS12}$ and $\overline{OUT}$ signals, together with a specific trunk type 5 signal $\overline{TRK5}$ at gate G115, are coupled to gate G146 to supply an output over line $\overline{AA}$ to set the SR latch flip-flop in chip 12A and set the CT latch flip-flop in chip 12B. At the next active junctor slot JT14, a signal to set the PL flip-flop $\overline{SET}$ $\overline{PLFF}$ is coupled through gate G112 to enable gates G134 and G143 to provide outputs on both leads $\overline{BA}$ and $\overline{DA}$ from gates G147 and G149, respectively. This causes a lock-up of the PL flip-flop in both matrix chips 12A and 12B. The junctor time slot signal JCT32 is also supplied as signal JCT32A at the output of the interface circuit.

Operation Sequence

Now having described the components and interconnections of the various types of adapters and associated circuitry above, the following description will set forth the manner in which calls are processed for the various types of trunk adapters.

Trunk Adapter -1 (Type 1 and 3 - Loop-Dial Outgoing, Ring-Down Incoming)

Outgoing Call

Call Set-Up

In setting up an outgoing call, the common control will provide a signal indicating that a local party wishes to be connected with a trunk. As a result, signals are supplied from the common control to the interface circuitry over line $\overline{ING\ OFF\ H}$ indicating that the calling party is off hook and over line $\overline{DSOO}$, corresponding to a service request. These signals are coupled to the appropriate gates in the interface circuitry, described above, to provide an output on line $\overline{AA}$, which is coupled to the matrix chip 12A in the trunk adapter circuit, shown,in FIG. 3. This causes the PL relay to be set at junctor slot JT6. Subsequently, for junctor slot JT 11, a signal from the common control corresponding to a trunk junctor seizure ($\overline{DS\ 12}$) is coupled to the interface circuitry at junctor slot JT 11 over line $\overline{AA}$ to the A input of the matrix chip 12A to set the CT relay. This closes the loop to the central office and, since the CT relay is operated, it produces an off-hook signal. The miltiplexing through the chip 12A advises the common control of the off-hook condition and the status of the call now shifts from that of a trunk junctor seizure to one of a trunk call in progress.

With the CT relay being operated, a trunk-off hook indication signal is supplied to the LR input of the matrix chip 12A, and the common control provides a signal to the interface circuitry over line DS 13 + S24 + S27 since the status has shifted to a trunk call in progress status (corresponding to the signal $\overline{DS13}$). As a result, an output is provided on the line $\overline{CA}$ the interface circuitry to maintain the CT relay set.

The central office next returns dial tone and the calling line dials the called number. During dialing, the PL relay will follow the calling bridge relay of the calling circuit, so as to pulse relay PL on and off. The central office then completes the connection and when the called party answers, the cental office may provide reverse battery and, if the optical coupler 30 and the diode D30 are inserted in the circuit to detect reverse battery, an input will be provided at input RV of matrix chip 12A upon detection of reverse battery from the central office. This signal is multiplexed through the chip and transmitted to the common control over the TD bus.

Call Disconnect

When the parties have finished talking, the local party may release the call, the central office being unable to release the call for a trunk type 1 and 3, as described previously. To this end, the common control will detect that the PABX party has gone back on hook and provide a signal to the interface circuit over line $\overline{DS16}$ corresponding to a trunk release delay signal. This signal is coupled through the interface circuitry to switch the PL relay. The CT relay will also release, to reconnect the ringing sensor made up of capacitor C13 and resistor R60 to the ring and tip lines for idle line termination. The release of the Ct relay produces a trunk on-hook indication. After an appropriate delay beginning with the initial on-hook condition, timed by the timer in our above referred to copending application entitled, "Timed Associated with CB Relay" the trunk is marked as free again.

Incoming Call

Call Set-Up

For setting up an incoming call from the central office, a 20 Hz ringing signal from the central office will be coupled over the tip and ring lines to the calling bridge 22. The output of the calling bridge, through the optical coupler 24 and the emitter follower transistor Q57, will supply a signal to input LR of the matrix chip 12A. Upon the signal at input LR of the matrix chip 12A being multiplexed to the common control over TD bus, the common control will detect the condition and will mark the trunk as busy. After a 0.2 second delay, the call is extended to an attendant. When the attendant answers, the status of the call shifts to one of a trunk call in progress. The common control provides a signal over input line DS 13 + S24 + S27 which is coupled through the interface circuitry over line $\overline{AA}$ to the matrix chip 12A to set the PL flip-flop. Similarly, the CT flip-flop is set, thereby removing the idle line termination provided by resistor R60 and capacitor C13 and close the loop to the central office to trip the ringing from the central office. A transmission path between the trunk and the central office is now complete.

The operation of the CT relay also provides an input to line LR as described above.

Call-Disconnect

Disconnection of the call between the central office and the local PABX party takes place in the same manner described above for the outgoing call. As was mentioned previously, for a type 1 and 3 trunk adapter, the call can be released only by the local PABX party, not by the central office.

Trunk Adapter-2 (Type 2 and 4-Two-Way Ground Start)

Outgoing Call

Call Set-Up

For a local PABX party desiring a connection with the central office, the common control will provide a signal over line $\overline{DS12}$ of the interfacing circuitry corresponding to a trunk junctor seizure. This signal is coupled from the output of the interface circuitry over line DA, through the appropriate gating circuitry, to matrix chip 12A, which signal is de-multiplexed to provide an output on the line $\overline{SR}$ to set the SR relay. The switch over of the contacts of the SR relay provides a ground coupling through resistor R41 to the ring lead, to seize the central office. The central office returns ground on the tip lead. This is sensed by optical coupler 24' to provide an input on line LR of the matrix shift 12A.

The common control detects the trunk-off-hook condition and provides a signal representative of a trunk calling in progress ($\overline{DS13}$) which is coupled to the output of the interfacing circuitry to the matrix chip 12A to activate the P L relay. At the appropriate junctor slot, the CT relay will also be activated to reduce the sensitivity of the bridge rectifier 22'-optical coupler 24' sensor circuit. The change-over of the status of the call from a trunk junctor seizure (S12) to a trunk calling progress (S13), represented by signals $\overline{DS12}$ and $\overline{DS13}$, respectively, removes the activating signal at the output $\overline{SR}$ of the matrix chip 12A to switch the relay SR.

With the idle line termination of the capacitor C9 and resistor R40 being removed by the activation of relay CT, the central office will return dial tone and the local PABX calling party will dial the desired number. During dialing, the PL relay will follow the dialing pulses from the on-hook and off-hook condition of the calling bridge of the calling circuit. The bridge rectifier 22' optical coupler 24' circuit will follow the loop current.

The central office party completes the connection and when the called party answers, reverse battery may be returned. As was the case with the trunk adapter 1 and 3, trunk adapter type 2 and 4 may or may not be equipped with reverse battery sensing. FIG. 4 shows the reverse battery sensing optical coupler 30' and diode D26 incorporated, corresponding to a trunk type 4. If the reverse battery sensing circuit is removed the trunk type is a trunk type 2. Assuming that we have a reverse battery sensor included in the circuit, as shown in FIG. 4, the optical coupler 30' and diode D26 will detect reverse battery from the central office. The signal input line RV will be multiplexed to the class of service buffer of the common control.

Call Disconnect—PABX Initially

When the conversation between the calling parties has terminated and the PABX party terminates the call first, the common control will detect the on-hook condition of the PABX party and advance the status of the call to status 16 (and provide a signal $\overline{DS16}$ to the interface circuitry). This signal is coupled therethrough to the matrix chip 12A to switch the relays PL and CT. Switching of the CT relay restores the sensitivity of the bridge rectifier-optical coupler circuit 22'-24' to its maximum sensitivity. At this time, the reduced loop current may release the reverse battery circuit.

This increases the loop resistance to 20,000 ohms, and the switching of the CT relay, the idle line termination provided by the capacitor C9 and resistor R40 is restored and the central office will detect a high impedance condition. Also, ground is removed from the tip lead and the loop current is reduced to 0 by the central office. The reverse battery sensor now provides no output signal on input RV, if not already having done so. The central office will detect the on-hook condition of the trunk and the trunk will again be marked free.

Disconnect Central Office Initially

Upon termination of the conversation of the central office and the calling party, the central office disconnects the connection first. If normal battery is restored, this will remove the signal on the input RV since the reverse battery sensing circuit will no longer provide an output. However, no other action will be taken. The central office will remove ground from the tip lead, so as to reduce the loop current to substantially zero. Again, if the reverse battery sensor has not previously released, i.e. it provides no output to the input RV of the matrix chip 12A, it will now release. The common control will detect the on-hook condition of the trunk, and by virtue of the change, signal line RV being multiplexed through the chip 12A through the TD bus. The common control now provides a signal over line $\overline{DS16}$ to the interface circuit to switch the relays PL and CT to restore idle line termination and again, the trunk will be marked free.

If, after the CT relay is released, the central office seizes the trunk before the trunk on-hook timer times out, the common control will provide a service request signal on line $\overline{DS00}$ immediately. This will maintain a PL CT and SR relays activated.

Incoming Call

Call Set-up

For an incoming call from the central office, the central office will apply ground to the tip lead and battery to the ring lead. This will be sensed by the bridge rectifier 22'-optical coupler 24' and provide an input to line LR of the matrix chip 12A. If ringing is applied, it will also operate the sensor except during zero crossings, as described previously. The common control will detect the off-hook condition and will extend the call to the attendant. When the attendant answers, the status of the call shifts to one of the trunk call being in progress and a signal is applied over lead $\overline{DS13}$ input to the interface circuit. The PL flip-flop in the matrix chip 12A is set, to activate the PL relay and, at the appropriate junctor slot, the CT relay is also activated by the formating of the input signal $\overline{DS13}$ through the interface circuitry and the demultiplexing through the matrix chip 12A. This will reduce the loop resistance to terminate the ringing from the central office. Activation of the CT relay again removes the idle line termination provided by resistor R40 and capacitor C9 to complete the transmission path.

Disconnect

For disconnecting the call between the parties, the same operation described above takes place.

Trunk Adapter-3 (Type 5-Two-Way Loop Dial-to-Dial)

Outgoing Call

Call Set-Up

In response to a request from a local PABX party desiring a connection to the central office, the common control will route the outgoing call to the trunk. Signals from the common control corresponding to the calling party being off-hook and a trunk junctor seizure condition, as was the case with an outgoing call for the 1, 3 type adapter, the interface circuitry will couple signals to the matrix chip 12B to switch the PL and CT relays. Signals for input lines $\overline{DS00}$ and $\overline{DS16}$ are coupled to through interface circuitry to set the RD latching flip-flop in the matrix chip 12B. As a result, a signal is coupled through amplifier A2 to the RD relay of the type 5 adapter. The normally closed contacts between the capacitor C1 the tip line TT remove the idle line termination RC network. The loop is closed through the central office to the relay windings of the LR relay. If the central office provides battery feed, the relay winding LR pulls up.

The common control detects the off-hook condition of the trunk by way of the format signals through the matrix chip and advances the status of the call to that of a trunk call in progress. The central office returns dial tone and the calling party now dials. The PL relay is switched by the pulsing of the calling party's CB relay and the LR input follows the loop current.

The common control ignores the LR input being low during out pulsing. when the calling party in the central office answers, reverse battery may be returned. If it is, the reverse battery sensor including the diode D1 and optical coupler 30" detects reverse battery from the central office. An input is supplied to input RV of the matrix chip 12B, and the reverse battery condition is formated over the TD output bus to the common control.

Call Disconnection — PABX Party Initially

When the local party goes back on-hook, this condition is detected by the common control which advances the status of the call to that of releasing the trunk. An input signal is supplied on line $\overline{DS16}$ of the interface circuit which is coupled to the matrix chip to switch the relays PL and RD in the adapter. The reclosure of the normally closed contact of the RD relay returns the idle line termination to the ringing and tip leads. This opens the loop to drop the LR loop current sensing relay. If the central office retains reverse battery, optical coupler 22' will pull up and maintain an apparent of-hook condition at the input LR of the trunk matrix chip 12B. When the central office restores normal battery or opens the loop, the optical coupler will no longer provide this output, so that the apparent off-hook condition will be removed. The optical coupler 22' now no longer provides an output signal to the matrix chip.

The common control detects the on-hook condition of the trunk and after the prescribed delay through the trunk timer filter of the latching flip-flops in the chip to be reset.

Call Disconnection—Central Office Initially

The central office may disconnect the call by one of two actions. The first action involves the restoration of normal battery. When this happens, optical coupler 30" and diode D1 detect the removal of reverse battery. This removes the input to line $\overline{RV}$ of the matrix chip 12B, so that the common control is advised of the trunk release. A trunk release signal is supplied over lead $\overline{DS16}$ of the interface circuitry, the outputs of which switch the PL relay and the RD relay. The deactivation of the RD relay again returns idle line termination. When the PL latch within the matrix chip 12B is reset, and the PL relay is deactivated, the open loop condition is dropped, to deactivate the LR relay and the trunk circuit releases, as described above.

Instead of restoring normal battery, the central office may provide an open loop. In this case, the sequence above takes place except that the reverse battery sensor and trunk off-hook timing will start at the same time instead of in sequence.

Incoming Calls

Call Set-Up

For incoming calls from the central office, the central office will close the loop, so that local battery will activate the LR relay. The loop between the trunk adapter and the central office is now complete and the common control will detect the trunk-off-hook condition and the trunk will be marked as busy. Signals on inputs DS16 and $\overline{DS00}$ from the common control are coupled to the interfacing circuitry to set the latch flip-flop RDFF, to activate the RD relay and remove idle line termination capacitor C1 and resistor R4.

As the dialed digits are received, the LR relay opens and closes. The common control stores the digits and sets up a connection to the called station. The on-hook intervals of the dial pulses are ignored by the filtering of the trunk timer, described in our above referred to copending application entitled "Timer Associated With CB Relay", filed Mar. 5, 1975. When a connection is made to the called party, ring-back tone is returned to the central office. If answer supervision is to be provided, signals are supplied over the inputs MPL, O32, (Out), $\overline{DS16}$ and $\overline{COSINTREC}$ of the interfacing circuitry which are appropriately gated to switch the latch flip-flop SRFF and thereby switch the SR relay.

Call Disconnection—PABX Party Initially

If the PABX party terminates a call first and goes back on hook before the central office goes back on hook, the common control detects this on-hook condition and supplies an input signal to the line $\overline{DS16}$ of the interface circuitry. This signal is formated through and supplied to the matrix chip 12B so as to cause the RD and SR relays to be reset. The SR relay will be reset, assuming that it was operated previously. This operation restores normal battery to the loop if it was reversed. The central office now detects normal battery and opens the loop.

The opening of the loop deactivates the LR relay and loop current is interrupted. The common control detects the on-hook condition and completes the release cycle described above except that the CT relay has not been operated. If the SR relay had not been operated, there would have been on PABX party first disconnection, because there would be no called party other than an intercept recorder.

Call Disconnection—Central Office Initially

When the central office goes back on hook before the PABX party goes back on hook to terminate the call, the on-hook condition of the central office will open the loop and thereby release the LR Relay. The common control will detect the signal which has been multiplexed through the trunk matrix to the TD outputs and will provide a trunk release delay signal to the input $\overline{DS16}$, as described above. This will deactivate the RD relay and the SR relay, assuming that the SR relay was operated. Idle line termination has now returned to the circuit and normal battery feed is restored. The common control locks out the PABX station and the trunk filter timer, described above, is started. After the timing filter action, all of the latch flip-flops are reset and, consequently, each of the relays PL, CT, RD and SR is reset.

Trunk Adapter-4 (Type 6 - Two-Way E and M)

Outgoing Calls

Call Set-Up

For setting up an outgoing call in the trunk adapter type 6, the common control will route the outgoing call to a trunk. A signal indicating that the calling party is off-hook over input line ING-OFF H is coupled through the interface circuit to the matrix 12B in the adapter type 6. This is multiplexed through the matrix chip 12B and supplied to the signal over the output line M to the central office after appropriate logic level transformation through the isoltion-level shift transistor circuitry. Signals on lines $\overline{DS00}$ and $\overline{DS16}$ are coupled through the interface circuit to the matrix chip 12B in the adapter to activate the relay RD and remove the idle line termination provided by capacitor C4 and resistor R60. When the central office supplies ground to the E lead, a trunk off-hook signal is produced via the TD output of the matrix chip 12B and is coupled to the common control. After the off-hook timer circuit verifies a true off-hook condition, the common control provides an input on line CBPT and the central office returns dial tone and the calling party dials. As the calling party dials, the M line follows the calling bridge relay of the calling party. The central office receives the digits and connects the trunk to the calling line so as to establish a path between the calling and the PABX party and the called central office party.

Call Disconnection—PABX Party Initially

When the PABX local party disconnects the call first, the common control will detect the on-hook condition and initiate the trunk release delay providing an input on $\overline{DS\ 16}$ to deactivate the RD relay and restore idle line termination and to change the output level on line M to the central office. This will extend a release signal to the central office by way of the M lead and when the central office opens the E lead on an on-hook condition is recognized. Through the operation of the off-hook timer, the common control again marks the trunk as being free.

Call Disconnection—Central Office Initially

Where the central office terminates the call first, the E lead will be open, the off-hook timer circuit is again activated and the common control provides an input on line $\overline{DS\ 16}$ for the trunk release delay. The M lead is switched and the RD relay is deactivated to restore idle line termination. After the timer filter delay provided the trunk is again marked free.

Incoming Call

Call-Set-Up

If a central office desires a connection with a PABX party, ground is extended over the E lead. The signal is multiplexed from the LR input of the matrix chip 12B to the TD output in its usual fashion and the common control detects the off-trunk condition. Signals over leads $\overline{S13}$ +S24 +S27 $\overline{DS00}$ and $\overline{DS16}$ are coupled to the circuit to the matrix chip 12B so that an output is provided over the $\overline{PL}$ lead to establish the appropriate level over the M lead to the central office. Also, the RDFF flip-flop in the matrix chip 12B is set, to activate the RD relay and remove the idle line termination provided by capacitor C4 and resistor R60. The digits from the central office are now received by way of the E lead and the pulse as described above in connection with the front type 5 circuit proceeds, except that there is no SR relay action.

Call Disconnection

The disconnection of an incoming call for the type 6 trunk adapter takes place in exactly the same fashion as it does for an outgoing call, described above.

We claim:

1. In a common control private automatic branch exchange telephone system having trunks and associated junctor circuits for connecting said system with a central office and being associated with said system on a time-shared basis,
    the improvement comprising a trunk adapter, interconnected with the junctor circuits of said system and with said central office, for carrying out a purality of different trunk functions which are continuosly monitored by said common control, to thereby effect the coupling of said system to said central office.

2. The improvement according to claim 1, wherein said system and said central office have tip and ring circuits and said trunk adapter is coupled to the junctors of said system and to said central office over the tip and ring circuits thereof and includes an optical coupler, responsive to the respective potentials on tip and ring leads of said tip and ring circuits, for detecting the presence of reverse battery voltages on said tip and ring leads and for generating a signal representative thereof.

3. The improvement according to claim 1, wherein said system and said central office have tip and ring circuits and said trunk adapter is coupled to the junctors of said system and to said central office over the tip and ring circuits thereof and includes electro-optic coupling means, responsive to a prescribed alternating ringing voltage on said tip and ring circuits, for converting said ringing voltage to a pulsed optical signal, and opto-electric coupling means responsive to said pulsed optical signal, for converting said optical signal into a prescribed signal representative thereof.

4. The improvement according to claim 3, wherein said trunk adapter includes an optical coupler, responsive to the respective potentials on tip and ring leads of said tip and ring circuits, for detecting the presence of reverse battery voltages on said tip and ring leads and for generating a signal representative thereof.

5. The improvement according to claim 1, wherein said trunk adapter includes a further optical coupler coupled to the junctors of the system for permitting two-way traffic through the system.

6. The improvement according to claim 1, further including traffic sensor means for resetting the system and turning off power thereto during times the system is not being used.

7. The improvement according to claim 1, further including means for providing an interfacing between relay portions and logic portions of the system.

8. In a common control private automatic branch exchange telephone system having trunks and associated junctor circuits for connecting said system with a central office and being associated with said system on a time - shared basis, each of said system and said central office having a sleeve lead,
    the improvement comprising a trunk adapter, interconnected with the junctor circuits of said system and with said central office, for carrying out a plurality of different trunk functions which are continuously monitored by said common control, to thereby effect the coupling of said system to said central office, independent of the state of said sleeve lead.

9. The improvement according to claim 8, wherein said system and said central office have tip and ring circuits and said trunk adapter is coupled to the junctors of said system and to said central office over the tip and ring circuits thereof and includes means, coupled to the common control of said system, for converting signals on said tip and ring circuits into prescribed logic signals and multiplexing said logic signals to said common control.

10. The improvement according to claim 9, wherein said means includes demultiplexing circuitry, responsive to control signals from said common control, and signal levels on said tip and ring leads, for storing signals representative of prescribed trunk circuit conditions during the establishment of a call connection between said system and the central office.

11. The improvement according to claim 10, wherein said trunk adapter includes an optical coupler, responsive to the respective potentials on said tip and ring leads, for detecting the presence of reverse battery voltages on said tip and ring leads and for generating a signal representative thereof.

12. The improvement according to claim 10, wherein said trunk adapter includes electro-optic coupling means, responsive to a prescribed alternating ringing voltage on said tip and ring circuits, for converting said ringing voltage to a pulsed optical signal, and opto-electric coupling means, responsive to said pulsed optical signal, for converting said optical signal into a prescribed signal representative thereof.

13. The improvement according to claim 11, wherein said trunk adapter includes electro-optic coupling means, responsive to a prescribed alternating ringing voltage on said tip and ring circuits for converting said ringing voltage to a pulsed optical signal, and opto-electric coupling means, responsive to said pulsed optical signal, for converting said optical signal into a prescribed signal representative thereof.

* * * * *